UNITED STATES PATENT OFFICE.

HENRY SALZER, OF BALTIMORE, MARYLAND.

METHOD OF PRESERVING FOOD.

SPECIFICATION forming part of Letters Patent No. 384,721, dated June 19, 1888.

Application filed March 22, 1888. Serial No. 268,060. (No specimens.)

*To all whom it may concern:*

Be it known that I, HENRY SALZER, of Baltimore, in the State of Maryland, have invented a new and useful Improvement in the Preservation of Food Articles, which improvement is fully set forth in the following specification.

This invention relates to the preservation of meat and other food articles for transportation and storage, and constitutes an improvement upon the process described in my pending application for United States Patent, filed September 26, 1887, No. 250,753.

The invention contemplates the production of a package containing the food articles, in which the latter may be preserved for an indefinite period from deterioration or decay, which can be quickly and easily removed when desired to use its contents, and which in handling and transportation is not likely to be injured or to permit access of air and destructive organisms to the article within.

According to the process described in my above-named application, the meat or other article is cut into pieces of convenient size, inclosed in an expansible wrapper, such as animal membrane, and subjected to a sterilizing steam heat for a period sufficient to kill all germs. It is then immersed in a bath of melted vaseline or its equivalent, which is allowed to harden and form a permanent coating around it, and finally inclosed in a protective wrapper, such as gauze coated with plaster-of-paris.

The object of the present invention is to simplify, expedite, and cheapen this process and to render it more effective, and according to my present mode of procedure, after inclosing the food article in its expansible wrapper I subject it, as before, to the heat of live steam for, say, thirty minutes, (more or less,) according to the nature and size of the package, which both destroys the micro-organisms and also contracts the bulk of the article, so that it is not likely thereafter to shrink. I then immediately apply a coating of plaster-of-paris, either directly on the outside of the expansible envelope, or to give it additional coherence, first spreading the plaster on a sheet of suitable fabric. The plaster is allowed to become thoroughly dry and hard. The article is then, in its plaster shell, placed in a bath of a plastic substance—such as vaseline or other petroleum derivative, or paraffine, or mixtures of them—and the latter is heated, preferably in an atmosphere of live steam, until all parts of the article have been sterilized by the heat. The plaster is hygroscopic and readily absorbs the vaseline or other substance through all its pores, and this substance forms a coating inside the plaster shell, completely filling the space between it and the inner wrapper. The article is allowed to cool off in this bath until the substance composing the latter reaches a tenacious consistency, when it is removed, and may then be dipped in melted paraffine, as a convenient way of melting off the adhering vaseline (if that substance has been used) and of filling the pores of the plaster and giving a smooth and even appearance to the outer surface. The package thus formed may be finally wrapped in paper, tin-foil, or other suitable material. This mode of procedure is found to effect a great improvement upon that described in my aforesaid application. It is much more quickly and easily carried out, and it avoids the difficulty of handling the article after the coating of vaseline or the like has been applied. Moreover, the pores of the plaster become filled with the plastic substance and additional protection is thus secured. The animal membrane or other expansible wrapper employed may be disinfected, as formerly done, and if gauze or other fabric be used with the plaster it may also be dipped in an antiseptic solution. Other modifications could be made without departing from the spirit of this invention.

While the use of animal membrane or a like expansible wrapper is in most cases desirable, it is not always essential, and the invention contemplates the preservation of food articles by applying the plaster coating and afterward immersing in the heated bath of vaseline or other plastic substance, whether or not an expansible wrapper be employed.

I claim—

1. The method of preserving a food article by inclosing it in an expansible wrapper, heating to reduce its bulk and destroy dangerous germs, coating with plaster-of-paris, drying, immersing in a bath of a plastic substance, such as vaseline, subjecting to heat therein, and cooling and removing from the bath, substantially as described.

2. The method of preserving a food article by inclosing the same in an expansible envelope, heating, coating with plaster-of-paris, immersing in a bath of vaseline or like substance and heating the same, removing from the bath after cooling, and finally dipping in melted paraffine, substantially as described.

In testimony whereof I have signed this specification in the presence of two subscribing witnesses.

HENRY SALZER.

Witnesses:
MURRAY HANSON,
WILLIAM H. BERRY.